United States Patent Office 3,493,331
Patented Feb. 3, 1970

3,493,331
PRODUCTION OF CRYOLITE MATERIAL
Donald Otis Vancil and Maurice Clark Harrison, Longview, Wash., assignors to Reynolds Metals Company, Richmond, Va., a corporation of Delaware
No Drawing. Filed Nov. 22, 1966, Ser. No. 596,088
Int. Cl. C01d *3/02;* C01f *7/50*
U.S. Cl. 23—88                7 Claims

ABSTRACT OF THE DISCLOSURE

Substantially silica-free cryolite material is precipitated directly from a silica-containing system by reacting a mixture of reactive alumina and a sodium compound with an acidic reactant having a fluorine-containing component, bringing the mixture to a pH between about 4.8 and 6.7.

---

This invention relates to the production of cryolite material by direct precipitation. More particularly, the invention concerns a method of producing substantially silicia-free synthetic cryolite having a weight ratio of sodium fluoride to aluminum fluoride less than about 1.5 to 1, and to the utilization of such low ratio cryolite in the operation of alumina reduction cells.

In natural cryolite ($Na_3AlF_6$), the weight ratio of NaF to $AlF_3$ is close to 1.5 to 1. In synthetic cryolites, including those produced by off-gas recovery processes which involve reacting sodium fluoride solution and sodium aluminate solution, followed by precipitation of the cryolite by the introduction of carbon dioxide gas, the products are usually characterized by a weight ratio of NaF to $AlF_3$ much in excess of 1.5, and which may run as high as 1.9, as well as by substantial silica contamination. The hypothetical reaction for the foregoing synthesis is:

$$6NaF + NaAlO_2 + 2H_2O + 4CO_2 \rightarrow Na_3AlF_6 + 4NaHCO_3 \quad (1)$$

Such synthetic cryolite may also contain substantial amounts of alumina and sodium carbonate, sometimes in the form of Dawsonite $Al_2O_3 \cdot Na_2CO_3$, and is thus alkaline in character.

During the operation of alumina reduction cells, the molten cryolite electrolyte gradually becomes depleted in fluoride content, by vaporization of components rich in aluminum fluoride. At the same time cryolite components rich in sodium are absorbed into the carbonaceous cathode of the reduction cell. Since it is generally considered desirable to maintain the NaF to $AlF_3$ weight ratio of the electrolyte within the range of about 1.3 to 1.5 for optimum cell operation, soda ash may be added during this period to replace the excess sodium collected in the cathode, and alkaline cryolite is advantageously used for this purpose. This phase of operation will usually occur within six to twelve months after a new cell is placed in use.

For the remaining two to three years of cell life it becomes necessary periodically to add aluminum fluoride and cryolite to match the composition of the vaporization losses. Where the make-up cryolite contains excess sodium fluoride, or sodium oxide, hydroxide or carbonate values, even greater amounts of expensive aluminum fluoride must be added to preserve the ratio. Thus, during the greater part of the operating life of an alumina reduction cell, both cryolite and aluminum fluoride must be supplied to the cell, necessitating the maintenance of inventories of such compounds, and increasing the cost of operation.

It is also customary to recover fluoride values from cell waste gases, and from used pot linings and other materials employed in the cells. This is usually accomplished by employing a caustic aluminate leach liquor, followed by carbonation to precipitate synthetic cryolite. The resulting cryolite is also alkaline and of limited usefulness.

In the aluminum industry, and for purposes of this invention, the term cryolite material is employed to denote a range of materials comprising mixtures of NaF and $AlF_3$ or one or more of the double salts of NaF and $AlF_3$, which double salts may also contain uncombined NaF or $AlF_3$. The cryolite materials are usually characterized by the ratio of the total weight of NaF contained in a given quantity to the total weight of $AlF_3$ present, without regard to the presence or absence of chemical bonding between the NaF and $AlF_3$. The value of this weight ratio for naturally occurring cryolite is about 1.5, in good agreement with the weight ratio of the molecular double salt $3NaF \cdot AlF_3$. X-ray and other evidence indicates the existence of two other double salts $$5NaF \cdot 3AlF_3$$

(weight ratio 0.833), and $NaF \cdot AlF_3$ (weight ratio 0.5).

It is also common in the aluminum industry to characterize cryolite materials by their "percent excess $AlF_3$," or "percent excess NaF," which terms are defined as the percent $AlF_3$ (or NaF) present in the material in excess of the amount required to form, with the NaF (or $AlF_3$) present, a cryolite of weight ratio 1.5. Thus, the double salts $5NaF \cdot 3AlF_3$ and $NaF \cdot AlF_3$ would be described as having about 24.1 and 44.5 percent excess $AlF_3$, respectively.

It has been proposed in the prior art to precipitate cryolite in an alkaline environment by the reaction of hydrogen fluoride with aluminum hydroxide, as indicated by the following equation:

$$12HF + Al_2O_3 \cdot 3H_2O + 6NaOH \rightarrow 2(3NaF \cdot AlF_3) + 12H_2O \quad (2)$$

in accordance with which the Na:Al molar ratio of the reactants is proportioned to be substantially equal to (or somewhat greater than) the 3:1 ratio of a so-called "neutral" cryolite. In order to avoid silica contamination of the product, however, this procedure requires the use of reactants which are essentially silica-free. This is accomplished conventionally by reacting silica-free HF with a purified alkali aluminate liquor produced in accordance with the well-known Bayer process, by digesting bauxite with caustic soda to form an alkali aluminate slurry containing undissolved impurities, and then treating the slurry to recover a clarified liquor.

In accordance with the present invention, however, the molar ratio Na:Al is kept below 3:1 and precipitation of cryolite material of a low $NaF/AlF_3$ ratio is accomplished by acidification of the mixture of reactive alumina and a suitable sodium compound, in the presence of fluorine, to a final pH of the reaction mixture in the range from about 4.8 to about 6.7, thereby retaining silica in solution and producing a substantially silica-free product. This procedure has the dual advantage of making possible the use of reactants containing silica, while also producing cryolite material having an $NaF/AlF_3$ weight ratio less than 1.5 to 1 as needed for reduction cell operations.

The reactive alumina should be in a form which is readily attacked by the acid reactant, as for example, Bayer process alumina trihydrate, sodium aluminate, aluminum hydroxide, or the mineral Dawsonite $$(Al_2O_3 \cdot Na_2CO_3)$$

which is commonly present in alkaline cryolite materials which have been precipitated by the reaction of carbon dioxide on caustic-fluoride solutions containing an excess of alumina. Any additional sodium values required may be introduced in the form of soda ash, caustic soda, sodium bicarbonate or the like. The use of sodium fluoride or sodium fluosilicate offers the benefit of also providing fluorine values, and the latter is sufficiently acidic to be effective for purposes of pH adjustment as well.

The amount of reactive alumina employed is sufficient at least to adjust the Na:Al molar ratio of the initial reactants to less than 3:1, preferably a slight excess of up to about 10% alumina by weight (dry basis) over the ratio desired in the final product in order to achieve optimum fluorine recovery.

There may be employed in accordance with the invention a wide range of acidifying reactants, including fluorine-containing substances such as HF and fluosilicic acid (or an alkali fluosilicate); or an alkali fluoride in admixture with a mineral acid such as hydrochloric, sulfuric, nitric, sulfurous or hypochlorous acids, or an aluminum salt of any such mineral acid. The fluorine-containing component of the system, introduced in the acid reactant or at least partially as an element of the required sodium compound, must be sufficient to provide the necessary fluorine for the final product. Any additional amount of acidifying reactant required to achieve the desired final pH may be one or more of the non-fluorine containing mineral acids or aluminum salts thereof previously mentioned.

It is believed that the reactive alumina, sodium compound and source of fluorine, when precipitation occurs under the specified pH conditions, are enabled to combine in the form of chiolite or other cryolite material comprising excess aluminum fluoride, while any silica present remains solubilized as $H_2SiO_3$, as indicated by the following hypothetical reactions:

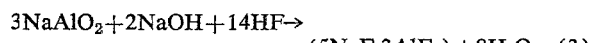
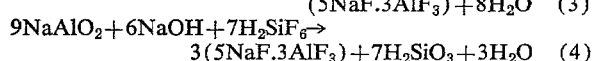

$$3NaAlO_2 + 2NaOH + 14HF \rightarrow (5NaF \cdot 3AlF_3) + 8H_2O \quad (3)$$
$$9NaAlO_2 + 6NaOH + 7H_2SiF_6 \rightarrow 3(5NaF \cdot 3AlF_3) + 7H_2SiO_3 + 3H_2O \quad (4)$$

A unique feature of the method of the invention lies in the fact that the precipitated cryolite material is recovered as a readily separable solid, while the impurities, and particularly silica impurities, are either taken into solution or remain in solution.

When using fluosilicic acid as the acid reactant, there should preferably be used a grade which contains a minimal amount of phosphorus compounds since these tend to collect in the cryolite product with resultant detriment to reduction cell operation. Where fluosilicic acid contains excessive amounts of $P_2O_5$, however, it can be purified by treatment with a sodium compound to precipitate sodium fluosilicate therefrom, which salt comes down substantially uncontaminated, with the phosphoric acid remaining in solution. The sodium fluosilicate thus obtained, being a strong acidic salt, can then be employed in lieu of fluosilicic acid.

The use of acid reactants of the character described typically produces cryolite material having only about 0.20% silica. It is paradoxical that an acid reactant such as fluosilicic acid (containing more than 40% silica as $SiO_2$) can thus be employed to produce substantially silica-free cryolite material, and this points up a novel and unexpected feature of the invention.

By adjusting the amount of acid reactant added, and controlling the proportion of sodium and reactive alumina, the resulting cryolite material produced has an NaF/AlF$_3$ weight ratio less than 1.5, and the level of such detrimental impurities as $Na_2CO_3$, $SiO_2$, $Fe_2O_3$, and $Na_2SO_4$ is reduced considerably. The pH may drop as low as 3 or 4, depending upon the rate of addition of the acid, but then rises slowly as any excess sodium compound is neutralized. The final pH appears to have a definite relation to the NaF/AlF$_3$ weight ratio, as well as being critical to the solubilizing of the silica. When the pH of the reaction mixture has reached about 6.0 to 6.5, it is found that about 90 to 98 percent of the fluorine originally present is contained in the insoluble low-ratio cryolite material produced.

The reaction temperatures ordinarily will be in the range of about 70° to 100° C., preferably about 85° to 90° C.

After the precipitation is completed, the cryolite product is filtered, and may be dried at not more than about 450° C., depending upon the use to which the cryolite is to be put.

The following examples illustrate the practice of the invention, but are not to be regarded as limiting:

EXAMPLE 1

Precipitation with hydrofluoric acid 1000 g. of caustic aluminate liquor containing 77.2 g. of alumina and 133 g. of free soda (i.e. caustic soda expressed as $Na_2CO_3$) is prepared by mixing 0.838 kg. Bayer green liquor with 0.162 kg. concentrated spent liquor, the latter containing about 56 g./kg. alumina and about 153 g./kg. free soda. The mixture has an alumina-to-free soda ratio of 0.58, corresponding to an Na:Al molar ratio of about 5:3.

This caustic liquor of adjusted ratio then is acidified with an acid reactant providing 0.141 kg. of HF, by bringing the reactants together in proportions such as to maintain the pH below about 6.5, to precipitate approximately 233 g. of cryolite material having an NaF/AlF$_3$ weight ratio of about 0.8.

EXAMPLE 2

Precipitation with $H_2SiF_6$

In the manner of Example 1, 1000 g. of the ratio adjusted caustic liquor is provided for reaction with about 0.169 kg. of fluosilicic acid to precipitate substantially silica-free cryolite material, by mixing the acid into the liquor (50° C.) and continuing the reaction at about 95° C. until the pH of the reaction mixture reaches a stabilized value of about 5.0–6.5.

EXAMPLE 3

The acid treatments of the foregoing examples are also applicable to the precipitation of silica-free cryolite material from a slurry or solution of caustic soda and Bayer process alumina trihydrate. Thus, the alumina and caustic soda are combined in the desired Na:Al molar proportions less than 3:1, preferably followed by digestion at a temperature sufficient to dissolve substantially all of the alumina, and the resulting solution is reacted with HF, or fluosilicic acid, in proportions controlled to provide intimate mixing of the reactants, and the reaction is continued until the pH of the reaction mixture reaches a stabilized value close to about 6.5. If excess acid is inadvertently added, additional quantities of the aluminate solution can be introduced to achieve pH control.

EXAMPLE 4

Treatment of residue black mud from pot lining caustic extraction, using $H_2SiF_6$ and/or HF Reduction cell potliner material (viz. insoluble residue following caustic soda extraction of pot lining to recover cryolite) containing 35% $Al_2O_3$, 1.75% caustic soluble F, 8% $CaF_2$, 1.5% $Fe_2O_3$, and 5% $SiO_2$, was pelletized with $Na_2CO_3$ and calcined at 1100° C., to obtain, after leaching with water, a product practically free from $Fe_2O_3$, but heavily contaminated with $Na_2CO_3$ and $SiO_2$. The amount of $Na_2CO_3$ was regulated so as to be sufficient for the production of low ratio cryolite. The reaction may be represented by the equation:

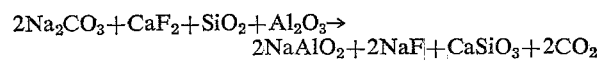

$$2Na_2CO_3 + CaF_2 + SiO_2 + Al_2O_3 \rightarrow 2NaAlO_2 + 2NaF + CaSiO_3 + 2CO_2$$

The presence of the correct excess of $Na_2CO_3$ in the calcination product permits reaction of all the sodium present with $H_2SiF_6$ or HF, in accordance with reactions (3) or (4) above.

Reference is made to the Vancil and Harrison applications Ser. Nos. 596,089, 596,087, and 596,236 all filed Nov. 22, 1966 and dealing with various methods of treating high-ratio cryolite material incident to reduction plant recovery operations.

While the presently preferred practices of the invention have been described, it will be apparent that the invention may be otherwise variously embodied and practiced within the scope of the following claims.

What is claimed is:

1. Method of producing a substantially silica-free synthetic cryolite having a weight ratio of NaF to $AlF_3$ less than 1.5 to 1 by direct precipitation from a silica-containing system, comprising the steps of reacting a mixture of reactive alumina and at least one sodium compound selected from the group consisting of $NaAlO_2$, NaOH, NaF, $Na_2CO_3$ and $Na_2CO_3 \cdot Al_2O_3$ with an acidic reactant having a fluorine-containing component, the amount of reactive alumina being sufficient to provide an Na:Al molar ratio of less than 3:1, while maintaining the system acidic, said acidic reactant being introduced in an amount such that the reaction mixture reaches a final pH in the range from about 4.8 to 6.7, the silica and dissolved impurities being retained in solution; and recovering the resulting synthetic cryolite.

2. The method of claim 1 in which said mixture comprises a caustic alkali solution containing dissolved alumina.

3. The method of claim 1 in which said acidic reactant is hydrofluoric acid.

4. The method of claim 1, in which said sodium compound and reactive alumina are proportioned to provide an Na:Al molar ratio of said mixture between about 1:1 and 3:1.

5. The method of claim 1 in which the reaction proceeds to a final pH of about 6.0 to 6.5.

6. The method of claim 1 in which said acidic reactant is fluosilicic acid.

7. The method of claim 1 in which the reactants are provided in Na:Al:F molar ratio of about 5:3:14.

References Cited

UNITED STATES PATENTS

| | | | |
|---|---|---|---|
| 1,873,727 | 8/1932 | Specketer | 23—88 |
| 2,996,355 | 8/1961 | Kamlet | 23—88 |
| 3,128,151 | 4/1964 | Zanon et al. | 23—88 |
| 3,207,575 | 9/1965 | Garing et al. | 23—88 |

FOREIGN PATENTS 546,971  10/1957  Canada.

EDWARD STERN, Primary Examiner

U.S. Cl. X.R.

23—110, 150, 182